(12) United States Patent
Baligh et al.

(10) Patent No.: US 9,577,703 B2
(45) Date of Patent: *Feb. 21, 2017

(54) SYSTEM AND METHOD FOR LOW DENSITY SPREADING MODULATION DETECTION

(71) Applicant: Huawei Technologies Co., Ltd., Shenzhen (CN)

(72) Inventors: Mohammadhadi Baligh, Ottawa (CA); Hosein Nikopour, San Jose, CA (US); Alireza Bayesteh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,241

(22) Filed: May 5, 2016

(65) Prior Publication Data

US 2016/0248472 A1 Aug. 25, 2016

Related U.S. Application Data

(63) Continuation of application No. 13/917,319, filed on Jun. 13, 2013, now Pat. No. 9,356,649.

(Continued)

(51) Int. Cl.
*H04B 1/707* (2011.01)
*H04B 1/709* (2011.01)
(Continued)

(52) U.S. Cl.
CPC .............. *H04B 1/709* (2013.01); *H04B 1/707* (2013.01); *H04B 1/71052* (2013.01); *H04J 13/0007* (2013.01)

(58) Field of Classification Search
CPC ... H04J 13/0007; H04B 1/707; H04B 1/71052
(Continued)

(56) References Cited

U.S. PATENT DOCUMENTS 3,020,078 A * 2/1962 Ray .................... B66C 1/62
294/106
3,374,305 A * 3/1968 Bower .................. H01R 9/00
174/255

(Continued)

FOREIGN PATENT DOCUMENTS

CN 102232319 A 11/2011
JP H11340952 A 12/1999
(Continued)

OTHER PUBLICATIONS

Supplementary European Search Report, EP Application No. 13863520.6, Applicant: Huawei Technologies Co., Ltd., dated Oct. 20, 2015, 7 pgs.

(Continued)

*Primary Examiner* — Daniel Washburn
*Assistant Examiner* — Berhanu Tadese
(74) *Attorney, Agent, or Firm* — Slater Matsil, LLP

(57) ABSTRACT

In one embodiment, a method for blindly detecting low density activity includes receiving, by a first node from a second node, a signal and executing a joint message passing algorithm (JMPA) on the signal, where executing the JMPA includes jointly producing a decoded signal and an activity list in accordance with the decoded signal, and calculating a plurality of a priori probabilities in accordance with a plurality of log likelihood ratios (LLRs) corresponding to the signal and a plurality of decoded LLRs.

20 Claims, 7 Drawing Sheets

Related U.S. Application Data

(60) Provisional application No. 61/737,601, filed on Dec. 14, 2012.

(51) Int. Cl.
*H04J 13/00* (2011.01)
*H04B 1/7105* (2011.01)

(58) Field of Classification Search
USPC .................................................. 375/150
See application file for complete search history.

(56) References Cited

U.S. PATENT DOCUMENTS

| | | | | |
|---|---|---|---|---|
| 3,385,839 | A * | 5/1968 | Honig | C08F 220/28 |
| | | | | 162/166 |
| 6,466,566 | B1 * | 10/2002 | De Gaudenzi | H04B 1/71055 |
| | | | | 370/342 |
| 7,218,665 | B2 | 5/2007 | McElwain | |
| 7,292,647 | B1 * | 11/2007 | Giannakis | H04L 1/0041 |
| | | | | 375/295 |
| 7,599,425 | B2 * | 10/2009 | Yue | H04B 1/709 |
| | | | | 370/335 |
| 8,020,078 | B2 | 9/2011 | Richardson | |
| 8,374,305 | B2 | 2/2013 | Takada | |
| 8,385,839 | B2 | 2/2013 | Ashkenazi et al. | |
| 2003/0198305 | A1 * | 10/2003 | Taylor | H04B 1/7105 |
| | | | | 375/341 |
| 2004/0213360 | A1 * | 10/2004 | McElwain | H04B 1/7105 |
| | | | | 375/340 |
| 2006/0047842 | A1 * | 3/2006 | McElwain | H03M 13/2957 |
| | | | | 709/231 |
| 2006/0067382 | A1 * | 3/2006 | Yedidia | H04L 5/0026 |
| | | | | 375/141 |
| 2007/0036250 | A1 * | 2/2007 | Niedzwiecki | H04B 1/7105 |
| | | | | 375/348 |
| 2009/0290667 | A1 | 11/2009 | McElwain | |
| 2010/0074342 | A1 * | 3/2010 | Shental | G06F 17/12 |
| | | | | 375/259 |
| 2012/0063556 | A1 * | 3/2012 | Hoang | H03L 7/087 |
| | | | | 375/371 |
| 2012/0098612 | A1 * | 4/2012 | Colavolpe | H04L 1/0048 |
| | | | | 332/119 |
| 2013/0120036 | A1 * | 5/2013 | Zhu | H03L 7/0805 |
| | | | | 327/156 |
| 2013/0191679 | A1 * | 7/2013 | Zhuang | H03L 7/0807 |
| | | | | 713/503 |
| 2014/0169412 | A1 * | 6/2014 | Baligh | H04B 1/709 |
| | | | | 375/150 |
| 2014/0254455 | A1 * | 9/2014 | Nikopour | H04W 72/1273 |
| | | | | 370/312 |
| 2014/0254544 | A1 * | 9/2014 | Kar Kin Au | H04L 5/0033 |
| | | | | 370/330 |
| 2015/0071182 | A1 * | 3/2015 | Bayesteh | H04L 5/0042 |
| | | | | 370/329 |

FOREIGN PATENT DOCUMENTS

| | | |
|---|---|---|
| JP | 2008515268 A | 5/2008 |
| WO | 2010102435 A1 | 9/2010 |

OTHER PUBLICATIONS

Hoshyar, R. "LDS-OFDM an Efficient Multiple Access Technique," 2010 IEEE 71st Vehicular Technology Conference (VTC 2010—Spring), May 2010, p. 1-5.

Liu, X., et al., "Interference Identification and Blind Multiuser Detection for Asynchronous CDMA Systems With Multipath Fading," IEEE Transactions on in Communications, vol. 55, No. 12, Dec. 2007, pp. 2257-2260.

Marinoni, A. et al., "Efficient Receivers for q-ary LDPC Coded Signals over Partial Response Channels," 2010 IEEE International Conference on in Communications (ICC), May 23-27, 2010, pp. 1-6.

Duei-Halen, A, "Decorrelating Decision-Feedback Multiuser Detector for Synchronous Code-Division Multiple-Access Channel", IEEE Transactions on Communication, vol. 41, No. 2, Feb. 1993.

Hoshyar, R. et al, "Novel Low-Density Signature for Synchronous COMA Systems Over AWGN Channel", IEEE Transactions on Signal Processing, vol. 56, No. 4, Apr. 2008.

International Search Report for Application No. PCT/CN2013/089572, Applicant Huawei Technologies Co., Ltd., mailed Mar. 27, 2014, 9 pages.

Lupas et al. "Linear Multiuser Detectors for Synchronous Code-Division Multiple-Access-Channels", IEEE Transactions on Information Theory, vol. 35, No. 1, Jan. 1989.

Radhakrishnan et al., "Joint Message-Passing Symbol-Decoding of LDPC Coded Signals over Partial-Response channels", IEEE Communications Society subject matter experts for publication in the IEEE ICC 2009 proceedings, Jun. 14-18, 2009.

Zhu, et al, "A Message-Passing Approach for Joint Channel Estimation, Interference Mitigation and Decoding", IEEE Transactions on Wireless Communications, vol. 8, No. 12, Dec. 2009.

Kimura et al., "A Blind Adaptive Decorrelating Detector Using Spatial Signature Estimation," IEICE Transactions on Fundamentals of Electronics, Communications and Computer Sciences, Oct. 1, 2006, 5 pages, E89-A, No. 10.

\* cited by examiner

US 9,577,703 B2

SYSTEM AND METHOD FOR LOW DENSITY SPREADING MODULATION DETECTION

This application is a continuation of U.S. patent application Ser. No. 13/917,319, filed on Jun. 13, 2013, entitled "System and Method for Low Density Spreading Modulation Detection," which claims the benefit of U.S. Provisional Application Ser. No. 61/737,601 filed on Dec. 14, 2012, and entitled "System and Method for Low Density Spreading Modulation Detection," which application is hereby incorporated herein by reference.

TECHNICAL FIELD

The present invention relates to a system and method for wireless communications, and, in particular, to a system and method for low density spreading (LDS) modulation detection.

BACKGROUND

Code division multiple access (CDMA) is a channel access method used by communication technologies, where several users send information simultaneously over a single channel, e.g. common frequencies, using different spreading signatures. CDMA involves spread-spectrum technology, where the modulated coded signal has a much higher data bandwidth than the data being communicated. Low density spreading (LDS) is a CDMA technique that utilizes sparse spreading signatures. LDS may typically require the receiver to have knowledge of the spreading signatures used by the various transmitters, which may significantly increase overhead. Hence, techniques for reducing overhead during LDS communications are desired.

SUMMARY

An embodiment method for blindly detecting low density activity includes receiving, by a first node from a second node, a signal and executing a joint message passing algorithm (JMPA) on the signal, where executing the JMPA includes jointly producing a decoded signal and an activity list in accordance with the decoded signal, and calculating a plurality of a priori probabilities in accordance with a plurality of log likelihood ratios (LLRs) corresponding to the signal and a plurality of decoded LLRs.

An embodiment first node includes a processor and a non-transitory computer readable storage medium storing programming for execution by the processor. The programming includes instructions to receive a signal from a second node, and execute a joint message passing algorithm (JMPA) on the signal, to jointly produce an activity list in accordance with a decoded signal, and calculate a plurality of a priori probabilities in accordance with a plurality of log likelihood ratios (LLRs) corresponding to the signal and a plurality of decoded LLRs.

An embodiment non-transitory computer readable storage medium stores programming for execution by a processor. The programming includes instructions to receive a signal from a second node and execute a joint message passing algorithm (JMPA) on the signal, to jointly produce an activity list in accordance with a decoded signal, and calculate a plurality of a priori probabilities in accordance with a plurality of log likelihood ratios (LLRs) corresponding to the signal and a plurality of decoded LLRs.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Aspects of this disclosure reduce overhead in low density spreading (LDS) networks by discovering (or otherwise identifying) LDS signatures via blind detection, thereby circumventing the need to communicate active signature assignments over the control channel. Hence, embodiments of this disclosure allow a receiver to perform LDS detection without having prior knowledge of the active signatures used to perform the transmissions. In one example, blind detection is achieved using a decorrelator. A received signal is decorrelated to produce an active signature list. Then, data is decoded from the received signal using the active signature list. In another example, blind detection is achieved using joint signature and data detection using MPA (JMPA). The data is decoded from the received signal while the active signature list is determined.

Figure 1:
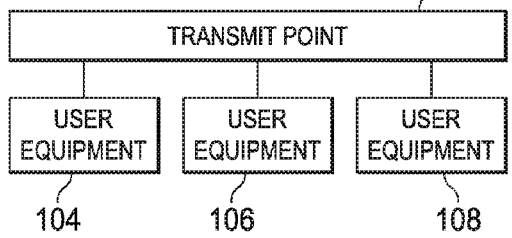
FIG. 1 illustrates an embodiment system for low density spreading (LDS) modulation detection.

FIG. 1 illustrates system 100, a wireless communications network that may be used for LDS modulation detection. System 100 includes transmit point 102, which provides voice and/or data wireless communication services to user equipments (UEs), such as UE 104, UE 106, and UE 108. Three UEs are pictured, but more or fewer UEs may be coupled to transmit point 102. Transmit point 102 may also be referred to as an access node, access point, or Node-B. Transmit point 102 transmits downlink information to UEs 104, 106, and 108, and receives uplink information from UEs 104, 106, and 108.

Figure 2:
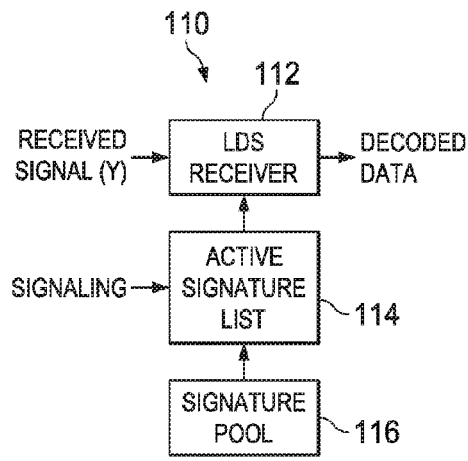
FIG. 2 illustrates an embodiment method for LDS modulation detection.

In an example using code division multiple access (CDMA), knowledge of active signatures is required at transmit point 102 for decoding signals received from UEs 104, 106, and 108, which requires signaling overhead. FIG. 2 illustrates flowchart 110 for a method of LDS modulation detection with knowledge of active signatures. UE 104, in step 116, examines a signature pool, which contains the pool of signatures that may be used. UE 104 has prior knowledge of the signature pool, because the signature pool is the common knowledge in the network. Because the signature pool is fixed, it can be set in advance.

Then, in step 114, transmit point 102 receives an active signature list from UE 104. UE 104 signals the active signature list to transmit point 102. In one example, the active signature list is explicitly signaled through the control channel. In another example, the active signature list is explicitly signaled through higher layer signaling. The active signature list is a subset of the signature pool.

Finally, in step 112, UE 104 performs LDS modulation detection on a received signal from transmit point 102 using the active signature list. LDS modulation involves using a message passing algorithm (MPA) based on belief propagation (BP). Message passing algorithm (MPA) is a multi-user detection based on belief propagation (BP) that may be used for LDS modulation detection. MPA takes advantage of the sparsity of signatures to reduce the complexity of multi-user detection. Also, BP is a technique used for performing inference on graphical models, such as Bayesian networks and Markov random fields. A spreading matrix may be used in step 112, where the number of rows indicates the spreading factor and the columns represent the active signatures (UEs). An example spreading matrix with a spreading factor of four and up to 6 active signatures (UEs) is given by:

$$S = \begin{bmatrix} 0 & 1 & -1 & 0 & i & 0 \\ 1 & 0 & i & 0 & 0 & -1 \\ 0 & -1 & 0 & i & 0 & 1 \\ i & 0 & 0 & -1 & 1 & 0 \end{bmatrix}.$$

The nonzero values of the spreading matrix are elements. The values in spreading matrix S are either 0 or have a normalization of 1. Many zeros in the spreading matrix indicate a low density structure of the matrix, which helps in the decoding be performed with a low complexity.

Figure 3:
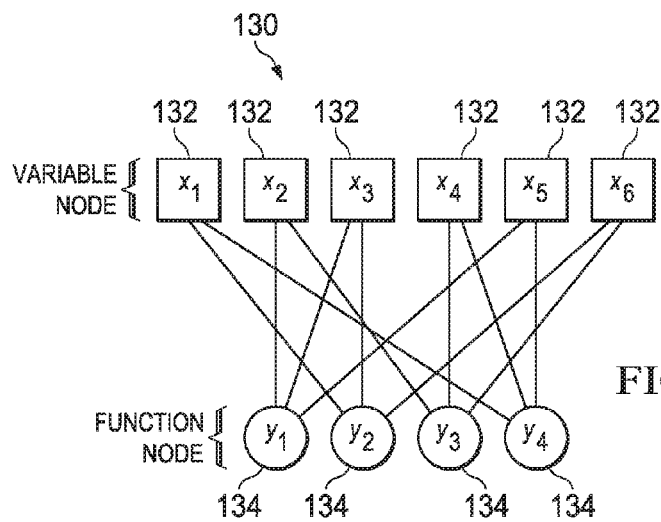
FIG. 3 illustrates a factor graph representation of a spreading matrix.

FIG. 3 illustrates factor graph 130, the factor graph representation of spreading matrix S. Factor graph 130 includes variable nodes 132 which are linked to function nodes 134. Variable nodes 132 correspond to the UEs (signatures), while function nodes 134 correspond to the received signals. The four function nodes are for four signals received over four tones, with a spreading factor of four. In quadrature phase-shift keying (QPSK), each branch contains four probabilities corresponding to each constellation point. The connections between variable nodes 132 and function nodes 134 correspond to the nonzero values of spreading matrix S. In an example, factor graph 130 is used to perform MPA iteratively. Initially, a vector containing a priori probabilities is used for variable nodes 132. These a priori values are used with the spreading matrix, S, to calculate the values at function nodes 134. The values at virtual nodes 132 are then calculated based on the values at function nodes 134. The values at function nodes 134 and variable nodes 132 are iteratively calculated. This back and forth information passing is repeated until the values at virtual nodes 132 converge on a solution. The converged probability values at variable nodes 132 are then processed to determine the six values for the six UEs. This updating the vectors or values back and forth between the variable nodes and the function nodes is also referred to as message passing or exchange between the two node sets.

Figure 4:
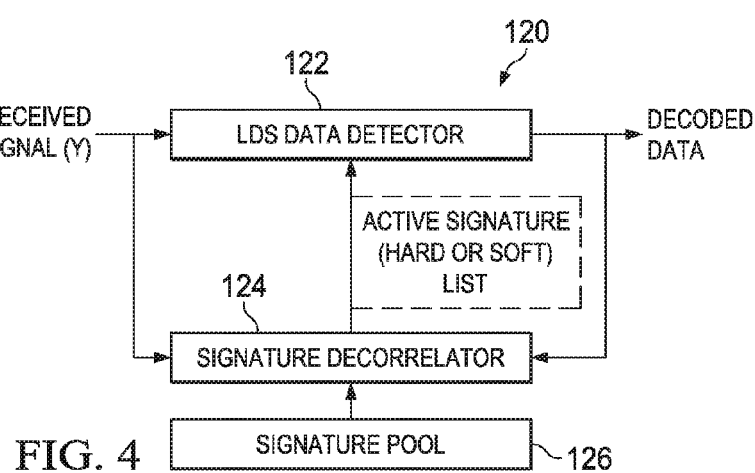
FIG. 4 illustrates another embodiment method for LDS modulation detection.

In another example, LDS modulation may be blindly detected. Blindly detecting LDS modulation is performed without knowledge of the active signatures, which reduces the signaling overhead. FIG. 4 illustrates flowchart 120 showing a method of blindly detecting LDS modulation using a decorrelator. Initially, in step 126, the signature pool is examined.

Then, in step 124, signature decorrelation is performed based on the signature pool and the received signal. The signature decorrelator produces a hard or soft list of active signatures, which is a subset of the signature pool.

A complementary signature matrix (CSM) is determined based on the spreading matrix. In the complimentary signature matrix, the zeros are in the same positions as in the signature matrix. The elements of the complimentary signature matrix are assigned to the same value or the negative of the value in the same position in the corresponding spreading matrix. The elements of the spreading matrix have a value of zero or a constant normalization value. For example, the elements of spreading matrix S have a normalization value of 1. Each signature of the spreading matrix has at most one intersection, or common non-zero position with all other signatures. Spreading matrix S satisfies these conditions. Each column of the complimentary signature matrix is orthogonal to the corresponding column of the signature matrix. The complimentary signature matrix of S is given by:

$$\tilde{S} = \begin{bmatrix} 0 & -1 & 1 & 0 & -i & 0 \\ -1 & 0 & i & 0 & 0 & 1 \\ 0 & -1 & 0 & -i & 0 & 1 \\ i & 0 & 0 & -1 & 1 & 0 \end{bmatrix}.$$

Assuming a spreading factor of N, the receive signal corresponding to the spread transmission signal is:

$$Y = \begin{pmatrix} y_1 \\ \vdots \\ y_N \end{pmatrix} = \sum_{k=1}^{J} I_k H_k S_k u_k + z,$$

where $I_k$ is the indicator parameter indicating whether the kth signature is active, $H_k$ is the channel matrix, $S_k$ is the kth signature, $u_k$ is the transmitted data for user k, and z is additive white Gaussian noise. $H_k$, may be written as:

$$H_k = \text{diag}(h_{k1}, \ldots, h_{kN}).$$

For a downlink scenario, $H_k$ is the same for all channels. $S_k$ is the kth column of the spreading matrix. $I_k$ has a value of either 0 or 1.

The received signal is decorrelated by two signatures, $S_i$ and $\tilde{S}_i$. For example, $$\Psi_i = S_i^H Y = \sum_{k=1}^{J} I_k H_k (S_i^H S_k) u_k + n_i,$$

and $$\tilde{\Psi}_i = \tilde{S}_i^H Y = \sum_{k=1}^{J} I_k H_k (\tilde{S}_i^H S_k) u_k + \tilde{n}_i.$$

The output of the decorrelator is then given by:

$$\Gamma_i = \overline{|\Psi_i|^2 - |\tilde{\Psi}_i|^2}, i=1, \ldots, J, \text{ and}$$

where $\overline{(.)}$ denotes the average over all LDS blocks in the bandwidth of interest. The decision on the active signatures is based on:

$$\vec{\Gamma} = (\Gamma_1, \ldots, \Gamma_J).$$

In some scenarios, assumptions may be made that simplify the design of the decorrelator. There may be channel state information (CSI). When there channel knowledge of the propagation channel, for example with zero forcing, the decorrelated signal is given by:

$$\Psi_i = S_i^H H_i^{-1} Y,$$

where $H_i^{-1}$ is the inverse of the channel. When there is maximal-ratio combining (MRC), the decorrelated signal is given by:

$$\Psi_i = S_i^H H_i^H Y.$$

However, without channel knowledge, the decorrelated signal is given by:

$$\Psi_i = S_i^H Y.$$

The signature detection used may be hard detection or soft detection. In hard detection, the decision of whether the signature is used is based on a function. However, in soft detection, the probability that the signature is active is determined. When hard detection is used, whether the signature is active or not is given by:

$$I_i = f(\vec{\Gamma}), i=1, \ldots, J.$$

When soft detection is used, the probability that a signature is active is given by:

$$P(I_i=1) = f(\vec{\Gamma}), i=1, \ldots, J.$$

The ordering of the signatures may be known or unknown. For example, the ordering may be hierarchical, where all inactive signatures are after all active signatures. When a signature k is active, all signatures with lower indices are also active, and when signature k is not active, all signatures with higher indices are also inactive. With hierarchical ordering, the probability that a signature is active is given by:

$$P\{I_k=1 | I_l=0\}=0, \text{ for } k<l.$$

Alternatively, all active signatures may be after all inactive signatures. When the ordering is unknown, all $I_k$s are independent of each other.

After decorrelation, LDS detection is performed in step 122 based on the received signal and the active signature list produced by decorrelation. The LDS data detection uses MPA based on BP to produce the decoded data. A spreading matrix, such as S, and a factor graph representation, such as factor graph representation 130 may be used to decode the data. The known active signatures indicate the factor graph. Information is iteratively passed back and forth between variable nodes 132 and function nodes 134. The LDS data detector finally produces decoded data.

When iterative soft signature detection is performed, signature decorrelation is again performed after LDS data detection, in step 124, based on the decoded data and the signature pool. Then, LDS data detection is again performed based on the received signal and the updated soft active signature list.

Some assumptions may be used to simplify the decorrelator design for a downlink scenario. Because the total transmission power is constrained in a downlink scenario, the power of each active signature will be scaled by the total number of active signatures when there is no power offset between signatures. For example, the power of the ith signature is given by:

$$P_i = \frac{P_{tot}}{N_A},$$

where $P_{tot}$ is the total power and $N_A$ is the number of active users.

Also, because the transmitter knows the number of active signatures in a downlink scenario, it may use them in a pre-determined order which is known to the UEs. For example, the transmitter may transmit the pre-determined order to the UEs. Additionally, the knowledge of the channel may be used for signature detection in a downlink scenario. Thus, blind signature detection with decorrelation may be performed with known CSI, hard detection, and a known signature ordering.

LDS may be used over M tones, where n=M/N blocks of LDS coders. The receiver computes the parameters $|\Psi_i(j)|^2$ and $|\tilde{\Psi}_i(j)|^2$ for the jth code block, where i=1, ..., J. The decorrelator output is computed as:

$$\Gamma_i = \frac{1}{n} \sum_{j=1}^{n} \left( |\Psi_i(j)|^2 - |\tilde{\Psi}_i(j)|^2 \right).$$

Then, the decorrelation output is normalized using:

$$\vec{\Gamma} = (\Gamma_1, \ldots, \Gamma_J),$$

such that $$\sum_{k=1}^{J} \Gamma_k = 1.$$

$\chi_k$ is defined as:

$$\chi_k = \Sigma_{i=1}^{k} T_i - k\Gamma_{k+1}.$$

The following algorithm may be used for some pre-determined threshold values $th_k$:

```
Set k = 1;
While N_A not found and k ≤ J do the following:
    If X_k ≥ th_k
        N_A = k;
        Return;
    End
    k = k + 1;
End
If N_A is not determined, N_A = J;
```

$N_A$ is the number of active signatures which, in the case of pre-determined signature order, provides the active signatures.

Figure 5:
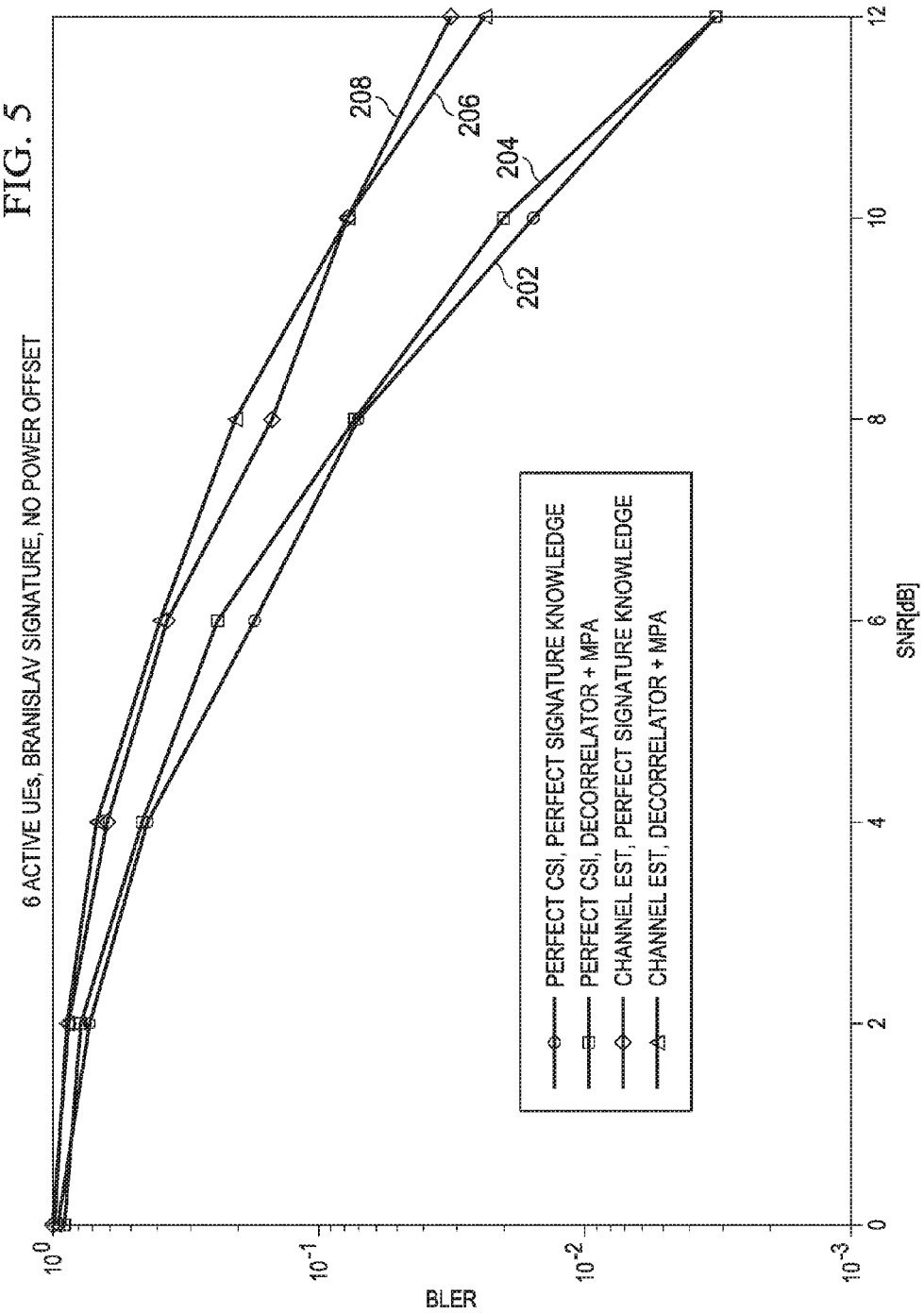
FIG. 5 illustrates a graph of block error rate (BLER) versus signal to noise ratio (SNR) for six active user equipments (UEs) and no power offset.

FIG. 5 illustrates a graph of block error rate (BLER) versus signal to noise ratio (SNR) in decibels (dB) for the downlink scenario for LDS modulation with six active UEs and no power offset. Curve 202 is with perfect Channel State Information (CSI) and perfect signature knowledge, curve 204 is for perfect CSI with signature decorrelation using an MPA, curve 206 is for channel estimation with perfect signature knowledge, and curve 208 is for channel estimation with signature decorrelation using an MPA. Thus, using signature decorrelation with an MPA for six active UEs and no power offset performs similarly to LDS detection with perfect knowledge.

Figure 6:
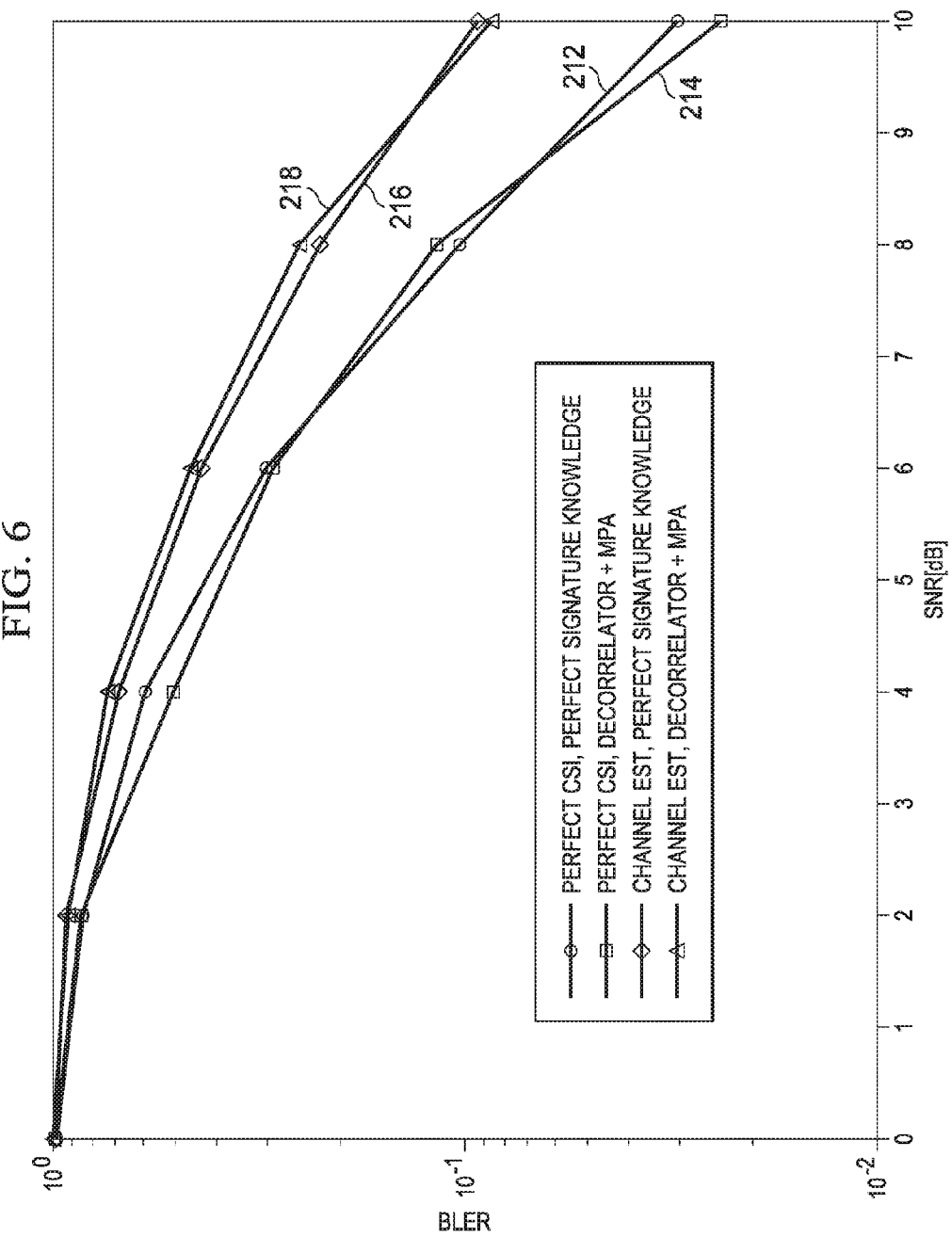
FIG. 6 illustrates a graph of BLER versus SNR for six active UEs and a 1 decibel (dB) power offset.

Also, FIG. 6 illustrates a graph for BLER versus SNR for a simulation for a downlink solution with six active UEs and a 1 dB power offset. Cure 212 is for perfect CSI and perfect signature knowledge, curve 214 is for perfect CSI with signature decorrelation using an MPA, curve 216 is for channel estimation with perfect signature knowledge, and curve 218 is for channel estimation with signature decorrelation and MPA. For six active UEs, LDS detection with signature decorrelation and an MPA works comparably to LDS detection with perfect knowledge with a power offset of 1 dB.

Figure 7:
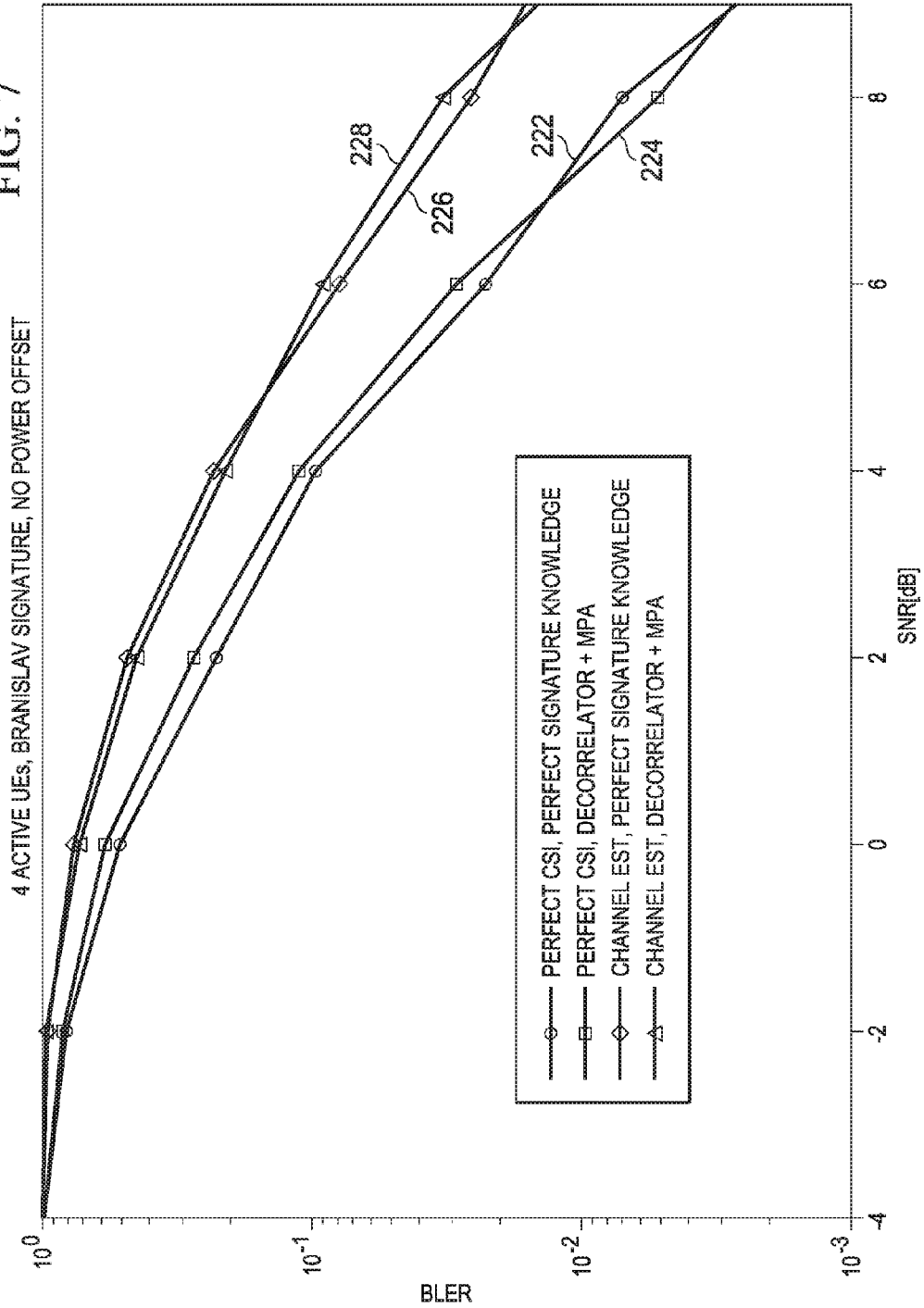
FIG. 7 illustrates a graph of BLER versus SNR for four active UEs and no power offset.

FIG. 7 illustrates a graph of BLER versus SNR for a simulation with four active UEs and no power offset. Curve 222 is for perfect CSI and perfect signature knowledge, curve 224 is for perfect CSI with signature decorrelation using an MPA, curve 226 is for channel estimation with perfect signature knowledge, and curve 228 is for channel estimation with signature decorrelation using an MPA. With four active UEs and no power offset, blind LDS detection with signature decorrelation performs similarly to LDS detection with perfect knowledge.

Figure 8:
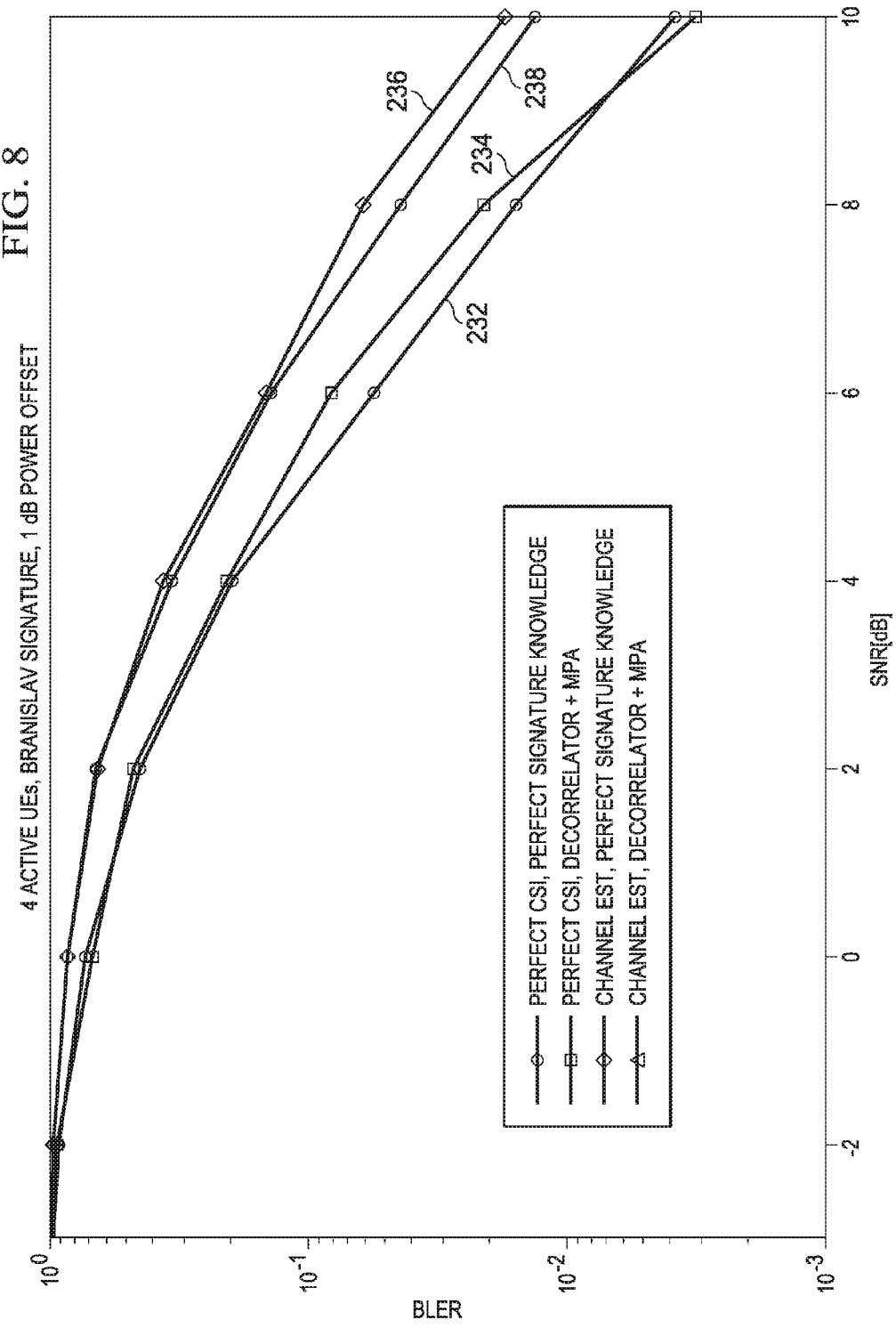
FIG. 8 illustrates a graph of BLER versus SNR for four active UEs and a 1 dB power offset.

FIG. 8 illustrates a graph of BLER versus SNR for a simulation with four active UEs and a power offset of 1 dB. Curve 232 is for perfect CSI and perfect signature knowledge, curve 234 is for perfect CSI with signature decorrelation using an MPA, curve 236 is for channel estimation and perfect signature knowledge, and curve 238 is for channel estimation with signature decorrelation using an MPA. Blind LDS detection using signature decorrelation and MPA performs similarly to LDS detection perfect signature knowledge with a power offset of 1 dB.

Figure 9:
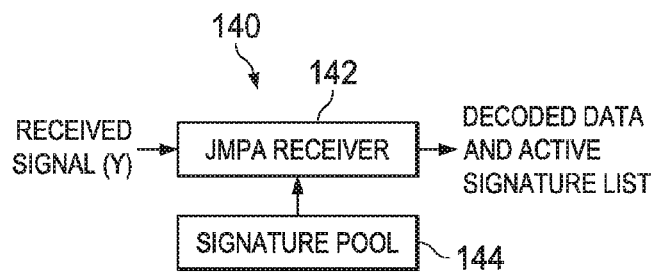
FIG. 9 illustrates another embodiment method for LDS modulation detection.

In another example, LDS is detected blindly using JMPA. In JMPA, detection of the data and the active signatures is performed jointly. FIG. 9 illustrates flowchart 140 showing a method of performing JMPA. Initially, in step 144, the signature pool is examined.

Then, in step 142, JMPA is performed based on the signature pool, and the received signal. The data is decoded and the active signature list is determined.

Figure 10:
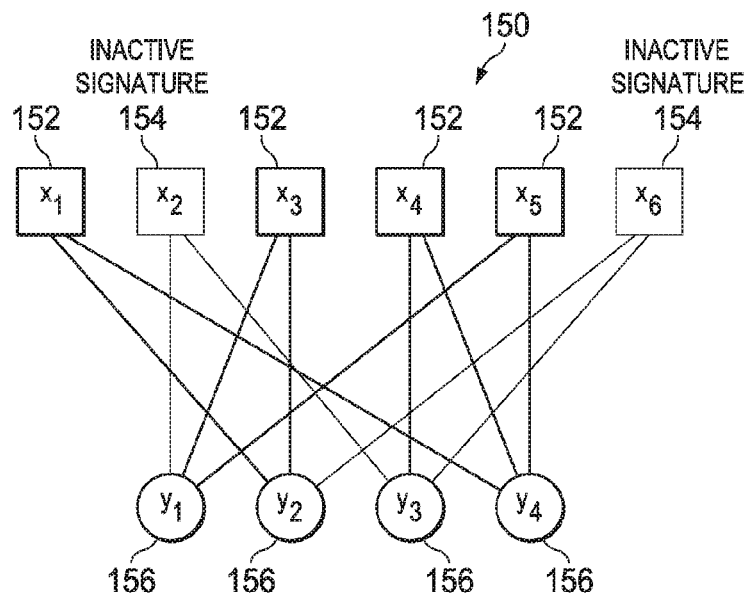
FIG. 10 illustrates a factor graph representation of a spreading matrix with inactive signatures.

Inactive signatures may be handled in multiple ways. To deal with inactive signatures, factor graph reduction may be used. FIG. 10 illustrates factor graph 150, which contains active variable nodes 152, inactive variable nodes 154, and function nodes 156. The size of the factor graph is reduced by removing inactive variable nodes 154 from factor graph 150. Alternatively, all variable nodes may exist, but inactive nodes have zero power.

Figure 11:
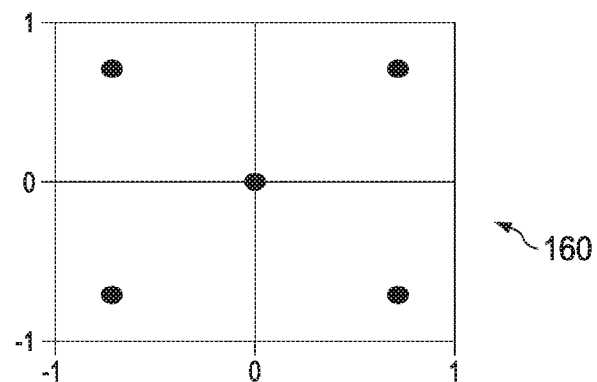
FIG. 11 illustrates constellation points for a full factor graph considering active and inactive signatures.

FIG. 11 illustrates constellation 160. Assuming the original constellation size of variable nodes is QPSK, when a variable node is inactive, its corresponding value is zero. The effective constellation is expanded to four QPSK points plus point zero, for a constellations size of five. Constellation point zero represents inactive signatures. An MPA may be initialized with a full factor graph assuming all signatures are active. The WA then runs with a full factor graph and a constellation size of five. At the end of an WA iteration, if a variable node is detected with the highest probability of zero, the corresponding signature is not determined to be active. When the highest probability is not zero at the end of an WA iteration, the log-likelihood ratios (LLRs) of the variable nodes are calculated based on the probability of the QPSK points.

JMPA may be treated as an WA where the number of constellation points is increased by one. In JMPA, the probability of constellation point zero is the same for all LDS blocks. This provides for a natural coding gain which can be used to improve the performance of JMPA. The process for JMPA is similar to the process of MPA. In JMPA, the probability of constellation point zero is given by:

$$p(0, j) := \frac{\prod_t p_x(0, j, t)}{\prod_t (1 - p_x(0, j, t)) + \prod_t p_x(0, j, t)}.$$

The probability of constellation point k from function node i to variable node j at point t is given by:

$$p_{FN \to VN}(i, j, k = 0, t) \leftarrow p(0, j)$$

and $$p_{FN \to VN}(i, j, k, t) \leftarrow \frac{p_{FN \to VN}(i, j, k, t)(1 - p(0, j))}{\sum_{k=1}^{4} p_{FN \to VN}(i, j, k, t)},$$

$$k = 1, \ldots, 4.$$

Figure 12:
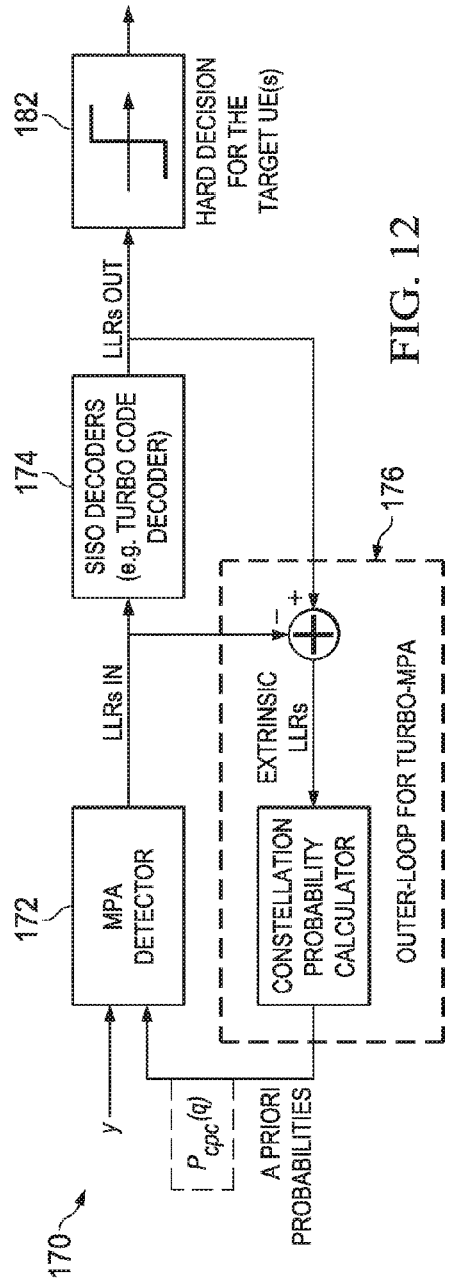
FIG. 12 illustrates an additional embodiment method for LDS modulation detection.

JMPA may be used with Turbo-MPA, as illustrated by flowchart 170 in FIG. 12. Turbo-MPA is further discussed in provisional patent application No. 61/788,881, filed on Mar. 15, 2013, which is hereby incorporated by reference. Flowchart 170 illustrates an outer-loop decision with a turbo code decoder and an outer-loop early determination detector. Step 172 performs an MPA, as discussed above. The LLRs are output based on the received signal and a priori probabilities.

In step 174, soft input soft output (SISO) forward error correction (FEC) decoding is performed. SISO FEC may be performed separately for each UE based on the input LLRs or probability values from the MPA. Output LLRs or probability values are also calculated.

In step 176, early termination of the MPA occurs based on the outer-loop termination indicator, e.g., when the updated probabilities converge according to a threshold at FEC outputs. A priori information for LDS detection is calculated based on the output of the SISO decoders. The difference between the LLRs is then calculated to obtain extrinsic information. Extrinsic information on the bits is used to update the a priori information about constellation points for every variable node or UE. An outer-loop convergence criterion may be defined to early terminate the outer loop iterations.

A hard decision is determined in step 182 based on the LLRs outputted in the SISO FEC decoding. Hard decisions may take place when there is early termination. Alternatively, the hard decision may be performed after a certain number of iterations.

In a downlink scenario soft detection with JMPA may be used. However, the complexity may be high.

In an example, an uplink solution uses JMPA. In the case that the uplink access is grant-less, the receiver does not know the identity of the user or have channel or ordering knowledge. Also, in uplink, the activation of different signatures is independent of each other. Hard or soft detection with JMPA may be used as an uplink solution.

If the number of LDS blocks is sufficiently large, $\Gamma_i$ can be approximated by a Gaussian random variable with a mean of $I_i \gamma_i$ and a variance of $\sigma_i^2$, where $\Gamma_i$ is the average received power for user i. For hard detection, $$I_i = \begin{cases} 1 & \Gamma_i \geq th_i \\ 0 & \Gamma_i < th_i \end{cases},$$

where $$th_i = \frac{\gamma_i}{2}.$$

For soft detection, $$P_{ext}(I_i = 1) = \frac{\exp\left(-\frac{(\Gamma_i - \gamma_i)^2}{2\sigma_i^2}\right) P_{ap}(I_i = 1)}{\exp\left(-\frac{(\Gamma_i - \gamma_i)^2}{2\sigma_i^2}\right) P_{ap} = (I_i = 1) + \exp\left(-\frac{\Gamma_i^2}{2\sigma_i^2}\right) P_{ap}(I_i = 0)}.$$

Figure 13:
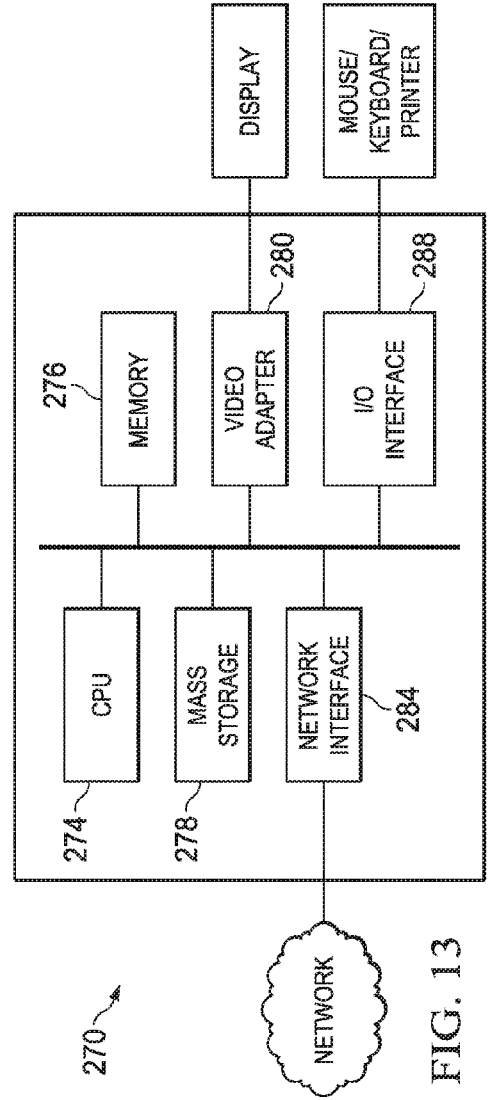
FIG. 13 illustrates a block diagram of an embodiment of a general-purpose computer system.

FIG. 13 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for blindly detecting low density activity, the method comprising:

receiving, by a first node from a second node, a signal; and executing a joint message passing algorithm (JMPA) on the signal, wherein executing the JMPA includes jointly producing a decoded signal and an activity list in accordance with the decoded signal, and calculating a plurality of a priori probabilities in accordance with a plurality of log likelihood ratios (LLRs) corresponding to the signal and a plurality of decoded LLRs.

2. The method of claim 1, wherein the first node is a user equipment (UE) and the second node is a transmit point.

3. The method of claim 1, wherein the first node is a transmit point and the second node is a UE.

4. The method of claim 1, wherein executing the JMPA further comprises executing the JMPA in accordance with a factor graph.

5. The method of claim 4, wherein an inactive signature is represented by a zero constellation point.

6. The method of claim 1, wherein executing the JMPA further comprises:
   executing a message passage algorithm (MPA) to produce the plurality of LLRs;
   decoding the plurality of LLRs to obtain the plurality of decoded LLRs; and
   executing the MPA in accordance with the signal and the plurality of a priori probabilities.

7. The method of claim 1, wherein executing the JMPA further comprises performing hard detection on the signal.

8. The method of claim 1, wherein executing the JMPA further comprises performing soft detection on the signal.

9. A first node comprising:
   a processor; and
   a non-transitory computer readable storage medium storing programming for execution by the processor, the programming including instructions to:
      receive a signal from a second node, and
      execute a joint message passing algorithm (JMPA) on the signal, to jointly produce an activity list in accordance with a decoded signal, and calculate a plurality of a priori probabilities in accordance with a plurality of log likelihood ratios (LLRs) corresponding to the signal and a plurality of decoded LLRs.

10. The first node of claim 9, wherein the first node is a user equipment (UE) and the second node is a transmit point.

11. The first node of claim 9, wherein the first node is a transmit point and the second node is a UE.

12. The first node of claim 9, wherein the instructions to execute the JMPA further comprise instructions to execute the JMPA in accordance with a factor graph.

13. The first node of claim 12, wherein an inactive signature is represented by a zero constellation point.

14. The first node of claim 12, wherein the instructions to execute the JMPA further comprise instructions to:
   execute a message passage algorithm (MPA) to produce the plurality of LLRs;
   decode the plurality of LLRs to obtain the plurality of decoded LLRs; and
   execute the MPA in accordance with the signal and the plurality of a priori probabilities.

15. The first node of claim 12, wherein the instructions to execute the JMPA further comprise instructions to perform hard detection on the signal.

16. The first node of claim 12, wherein the instructions to execute the JMPA further comprise instructions to perform soft detection on the signal.

17. A non-transitory computer readable storage medium storing programming for execution by a processor, the programming including instructions to:
   receive a signal from a second node; and
   execute a joint message passing algorithm (JMPA) on the signal, to jointly produce an activity list in accordance with a decoded signal, and calculate a plurality of a priori probabilities in accordance with a plurality of log likelihood ratios (LLRs) corresponding to the signal and a plurality of decoded LLRs.

18. The storage medium of claim 17, wherein the instructions to execute the JMPA further comprise instructions to execute the JMPA in accordance with a factor graph.

19. The storage medium of claim 18, wherein an inactive signature is represented by a zero constellation point.

20. The storage medium of claim 17, wherein the instructions to execute the JMPA further comprise instructions to:
   execute a message passage algorithm (MPA) to produce the plurality of LLRs;
   decode the plurality of LLRs to obtain the plurality of decoded LLRs; and
   execute the MPA in accordance with the signal and the plurality of a priori probabilities.

* * * * *